March 19, 1935.  H. E. TWOMLEY  1,994,798
MACHINE FOR MAKING VARIOUS SIZED CRATE HEADS
Filed Aug. 15, 1931   14 Sheets-Sheet 7
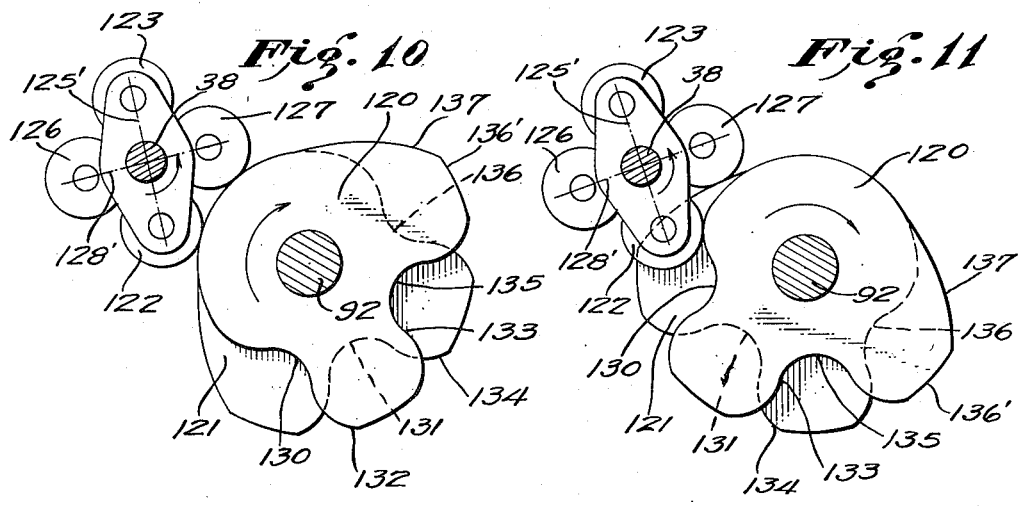
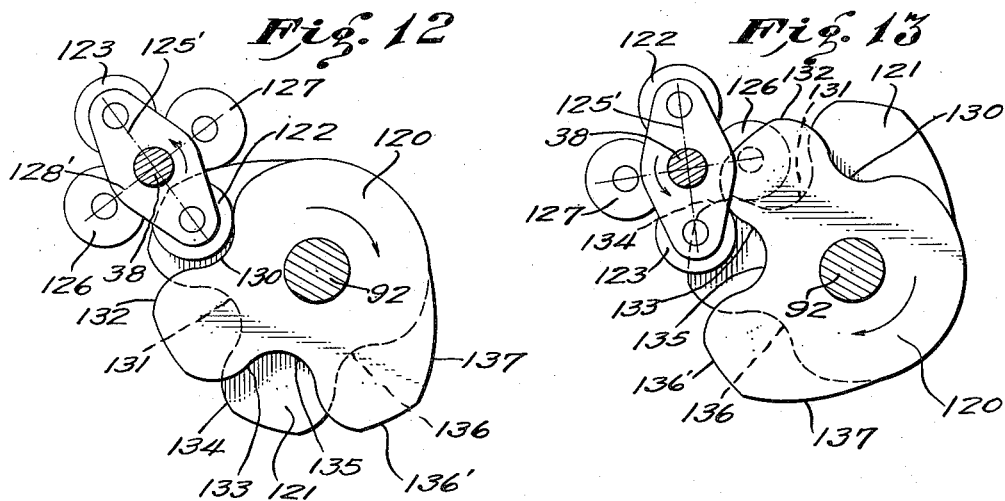
INVENTOR
HERBERT E. TWOMLEY
BY John Flam
ATTORNEY March 19, 1935. H. E. TWOMLEY 1,994,798
MACHINE FOR MAKING VARIOUS SIZED CRATE HEADS
Filed Aug. 15, 1931 14 Sheets-Sheet 8
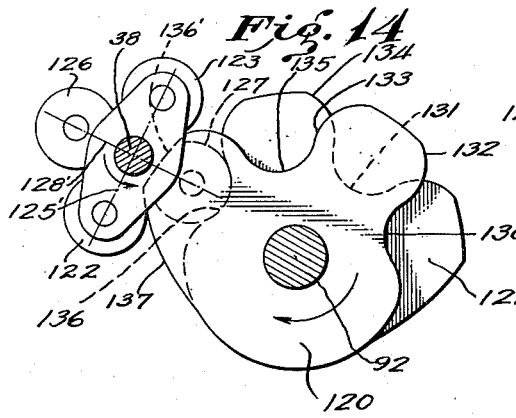
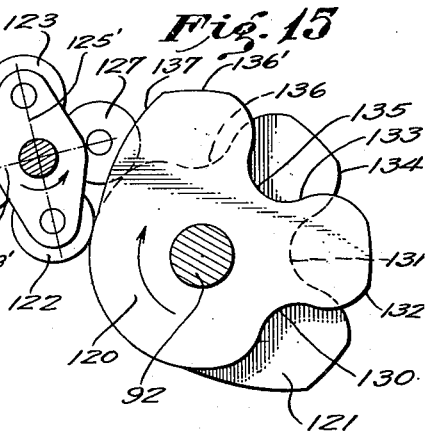
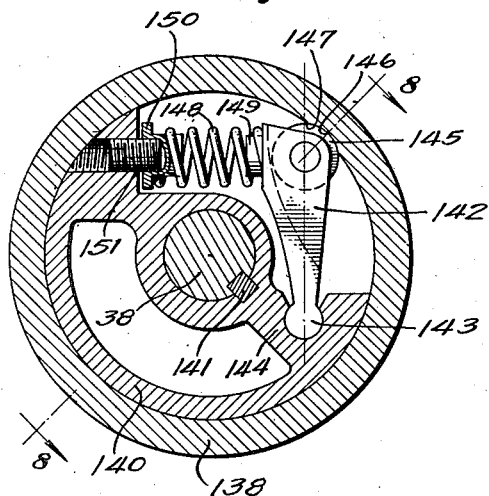
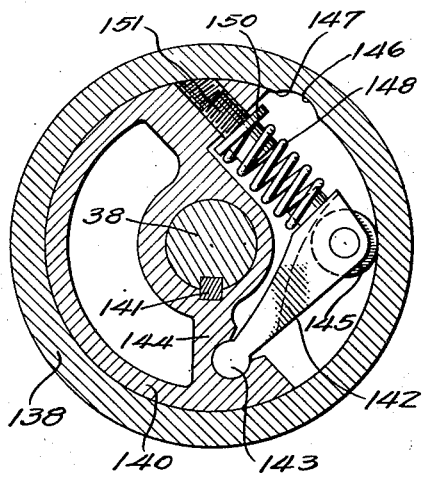
INVENTOR
HERBERT E. TWOMLEY
BY John Flam
ATTORNEY

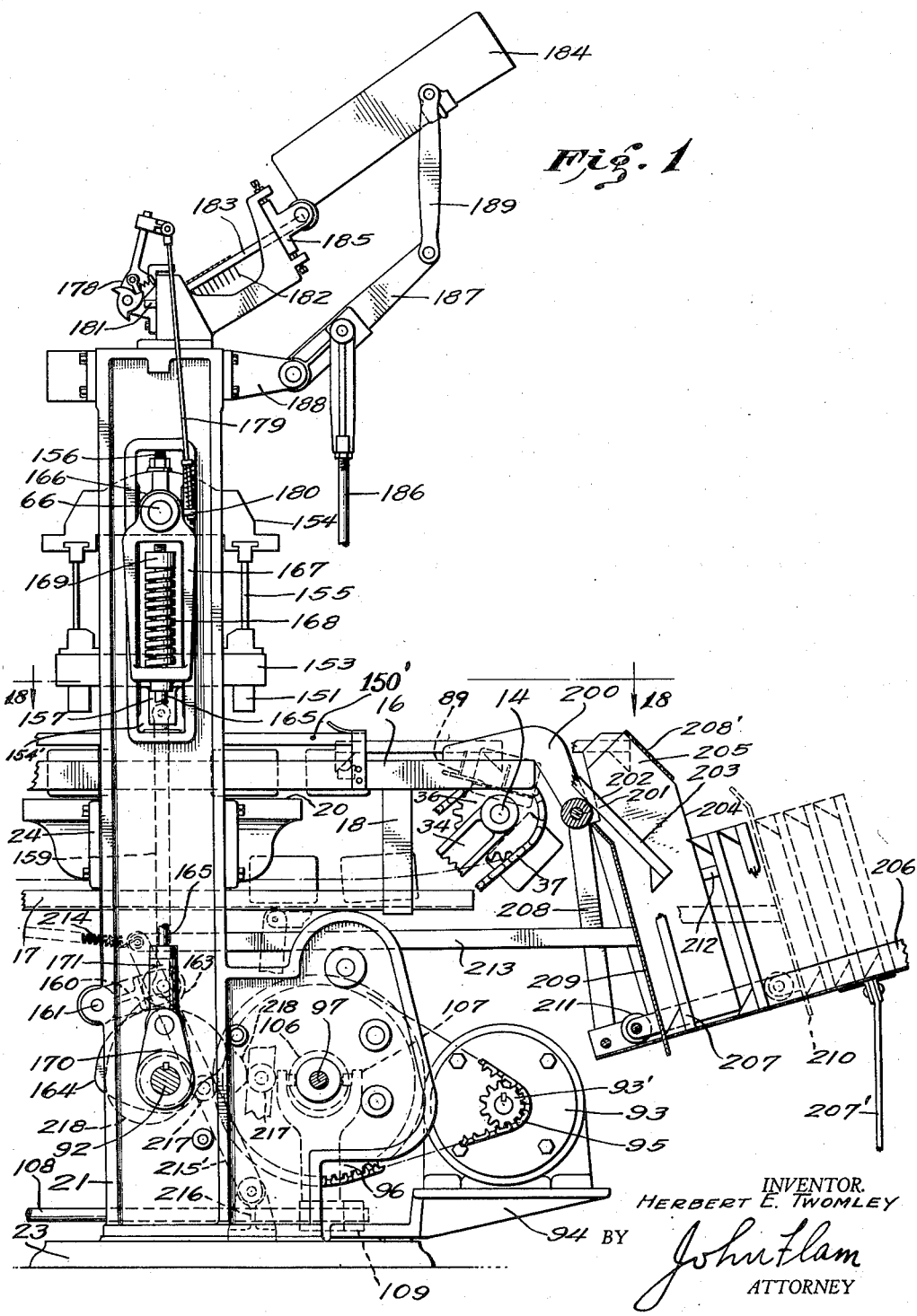

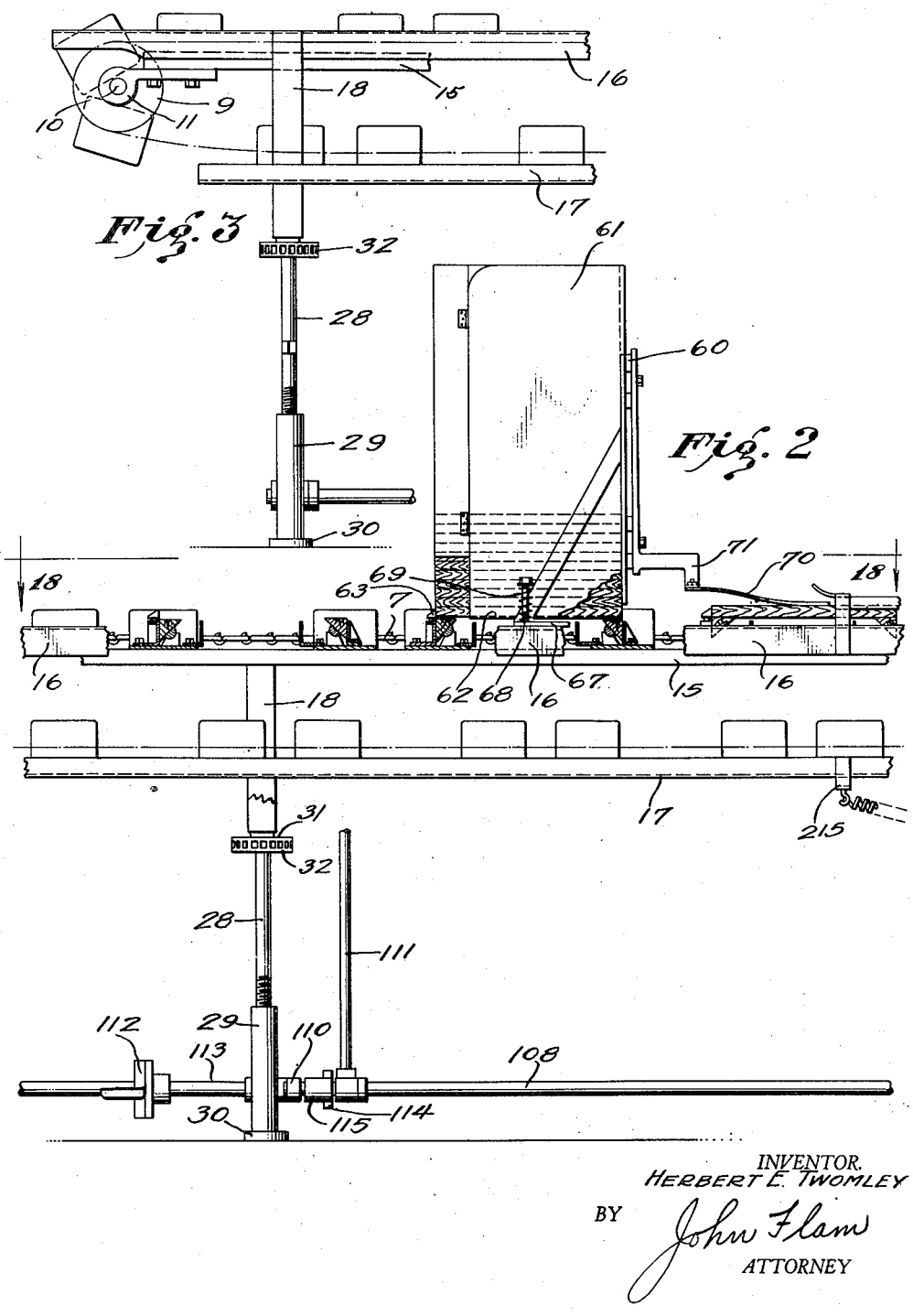

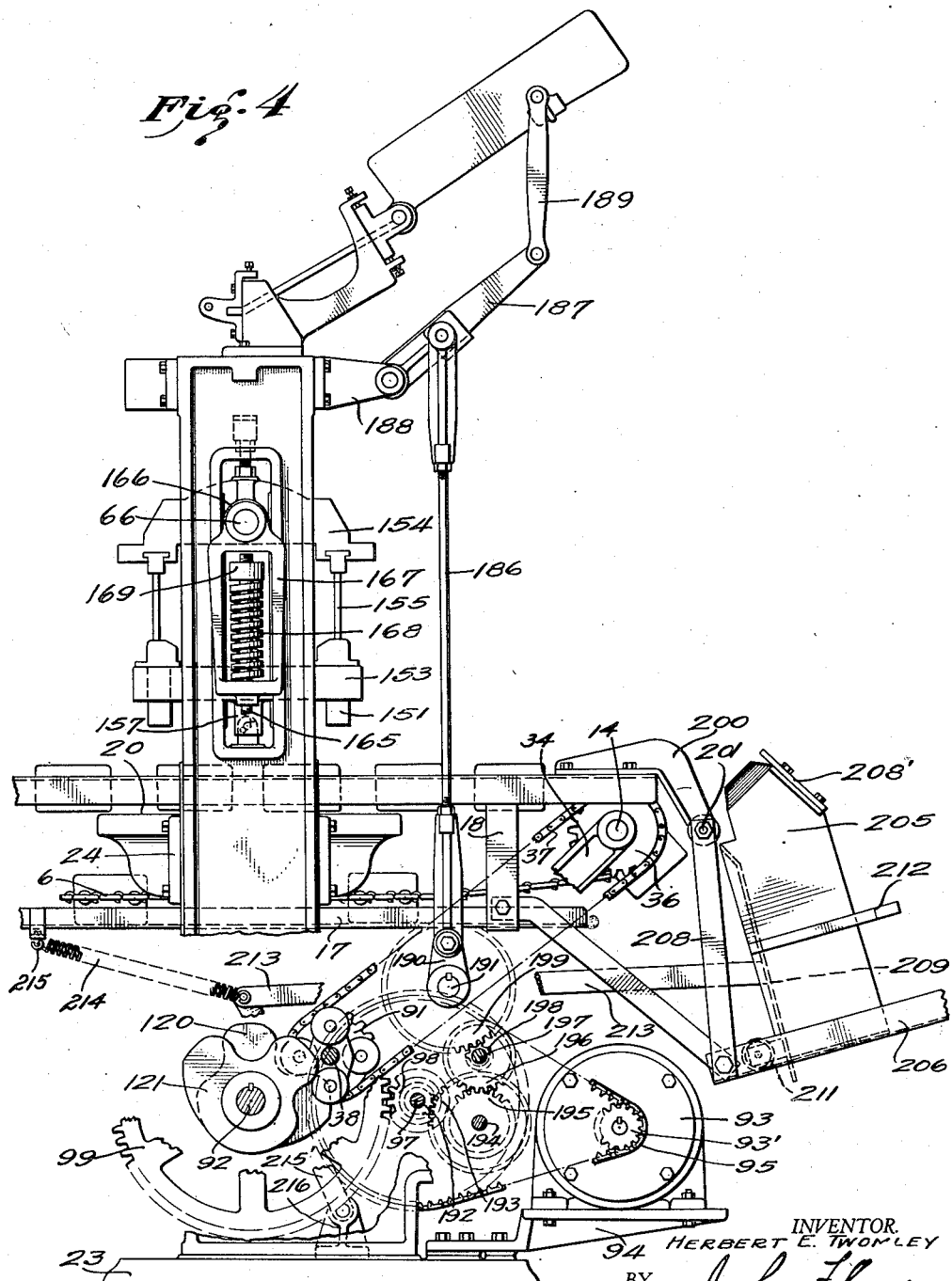

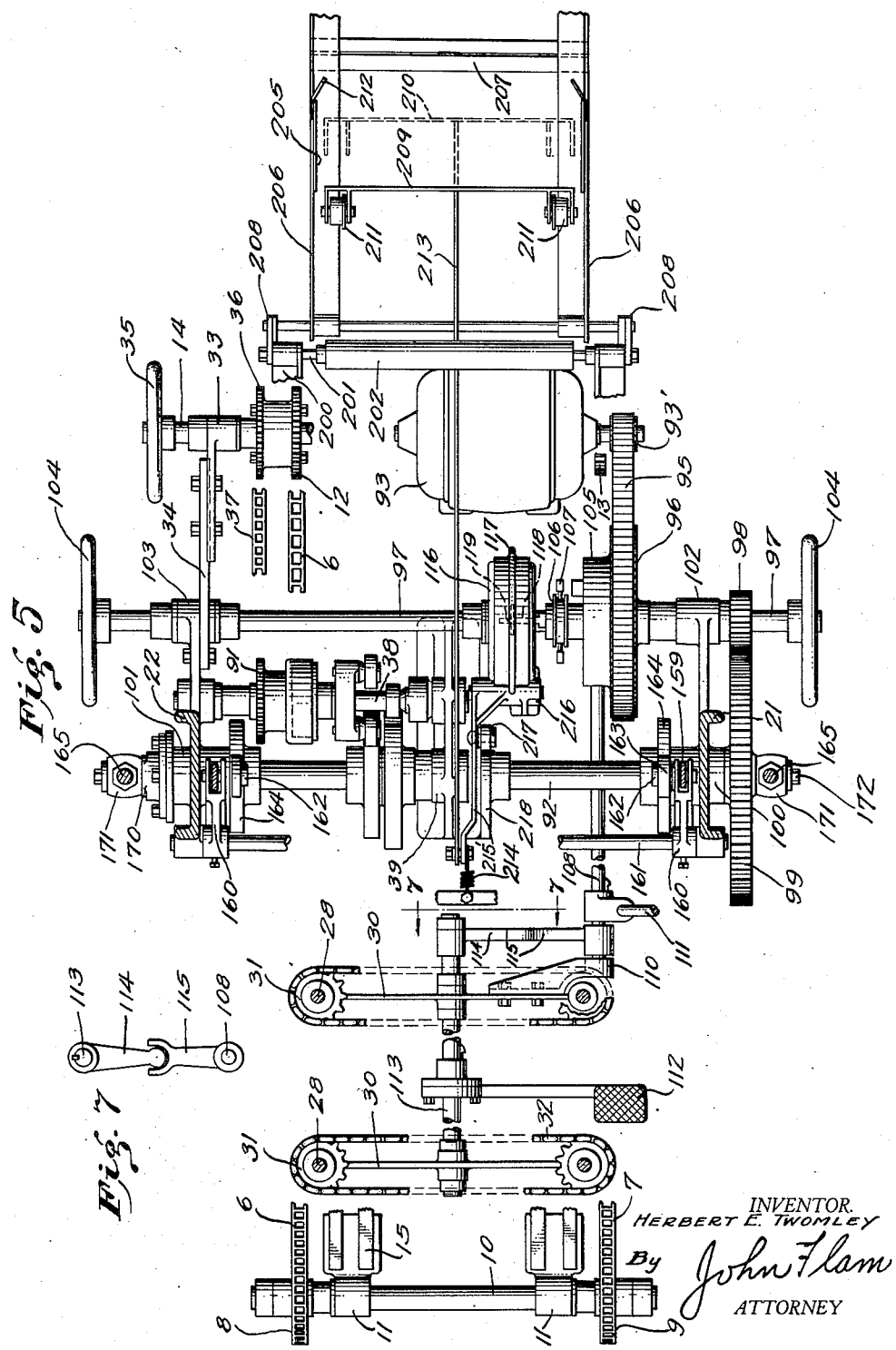

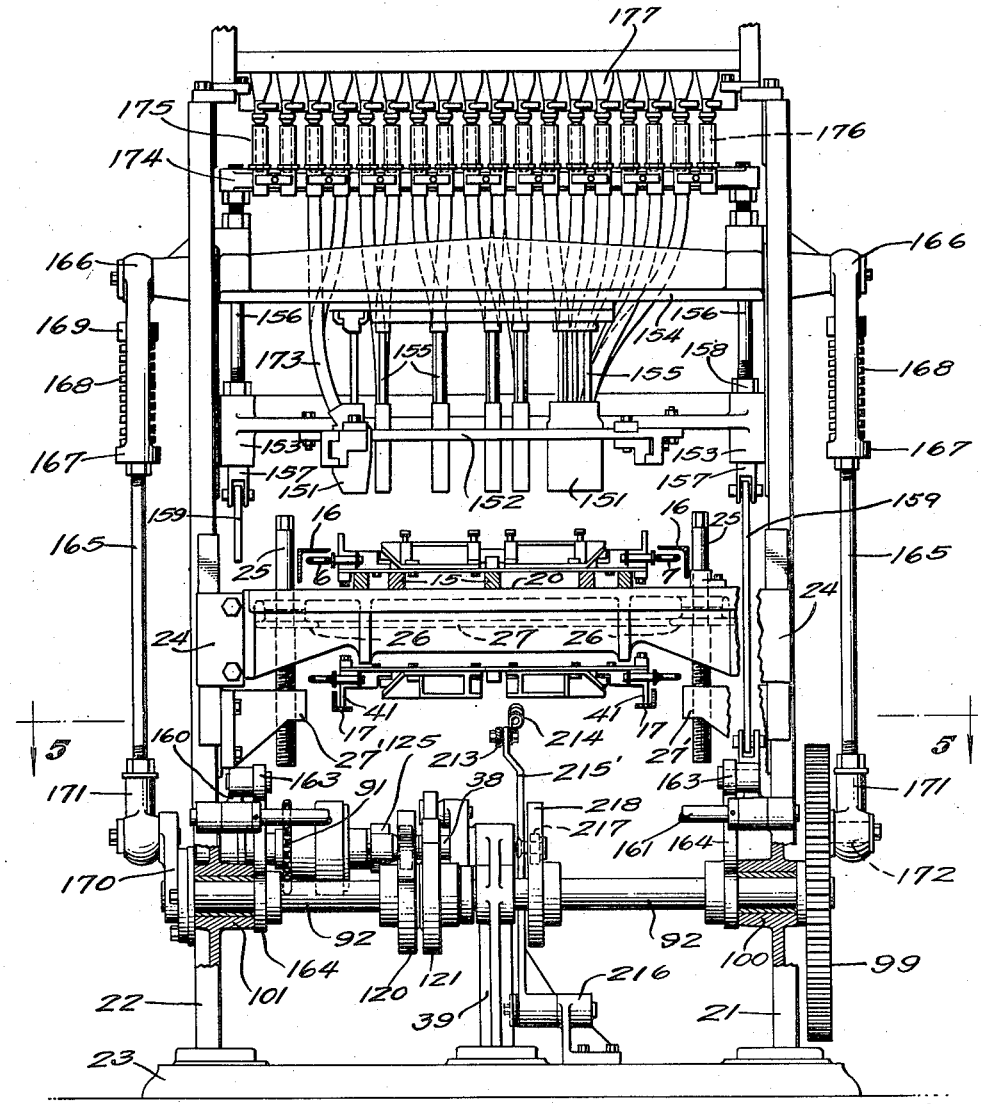

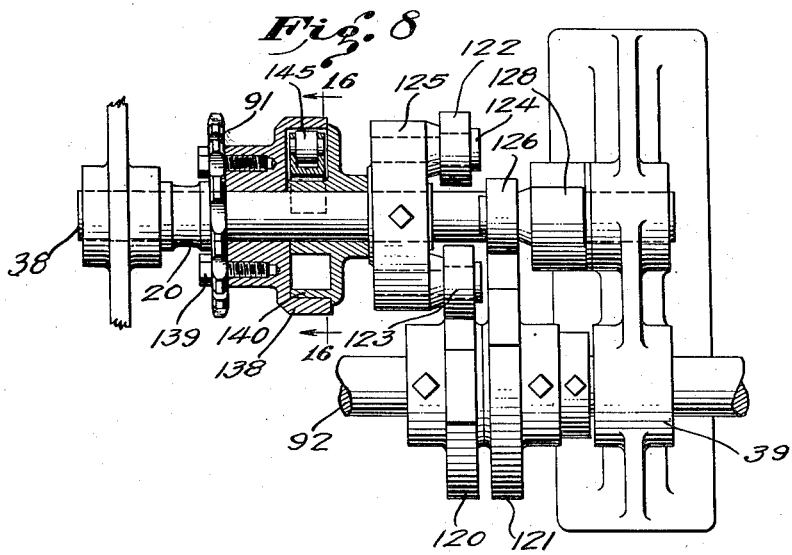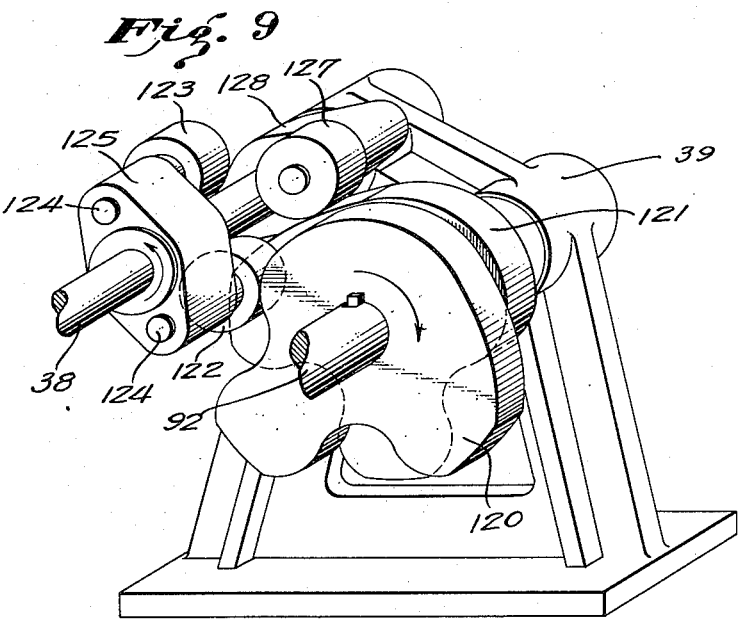

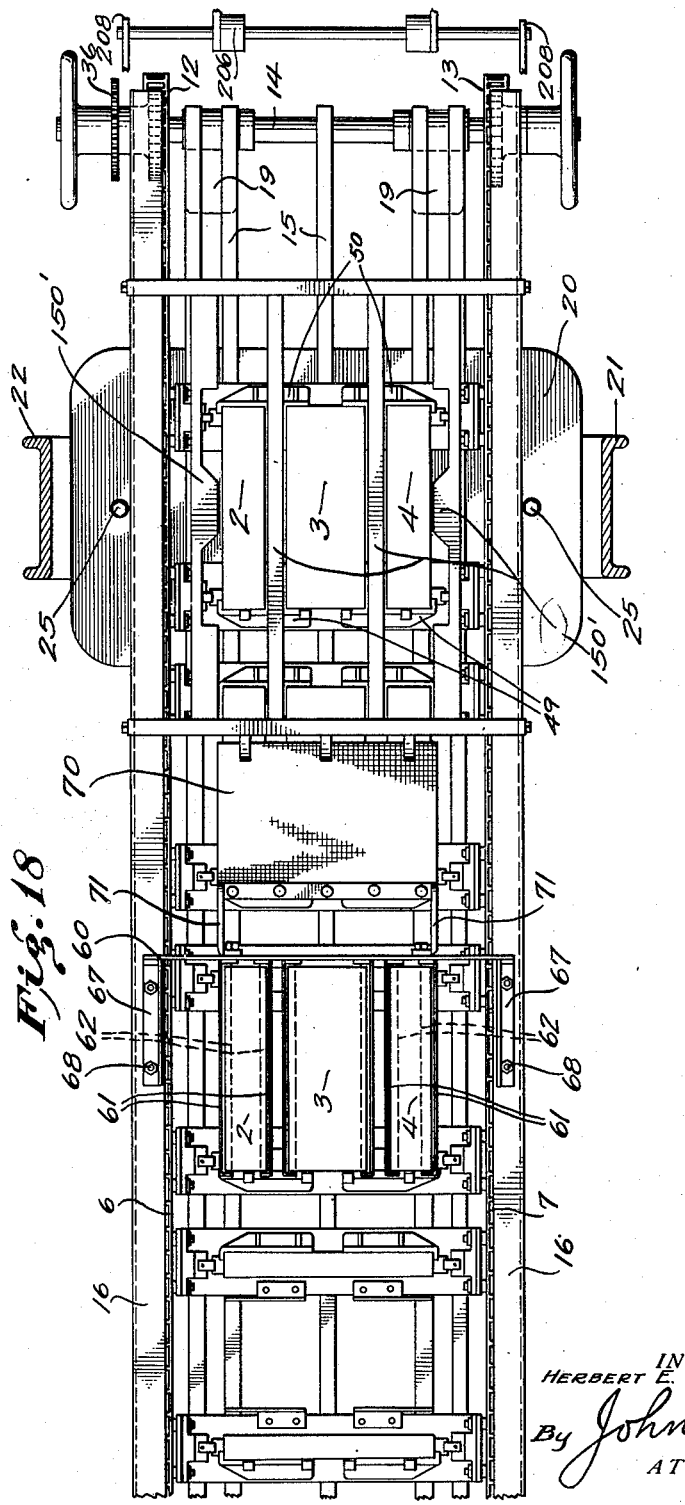

March 19, 1935. H. E. TWOMLEY 1,994,798
MACHINE FOR MAKING VARIOUS SIZED CRATE HEADS
Filed Aug. 15, 1931 14 Sheets-Sheet 10
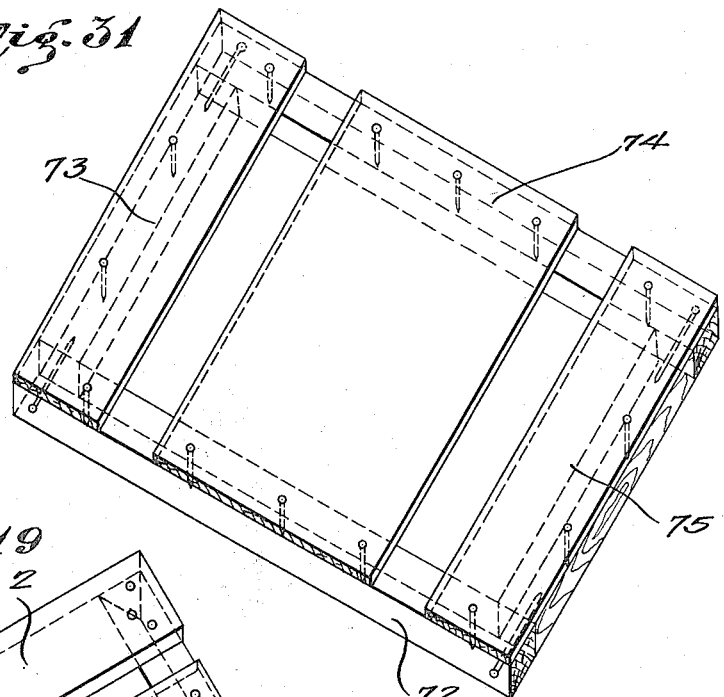
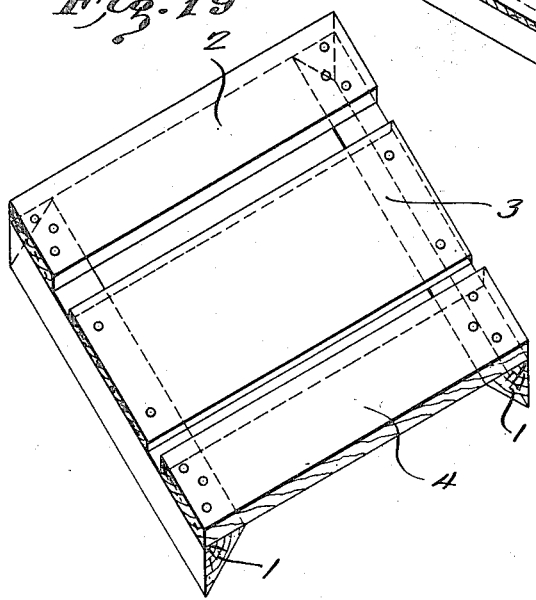
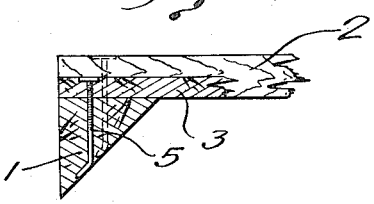
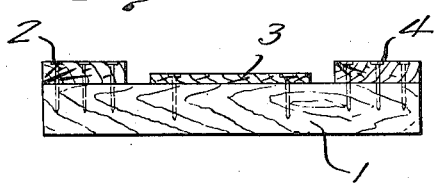
INVENTOR
HERBERT E. TWOMLEY
BY John Flam
ATTORNEY

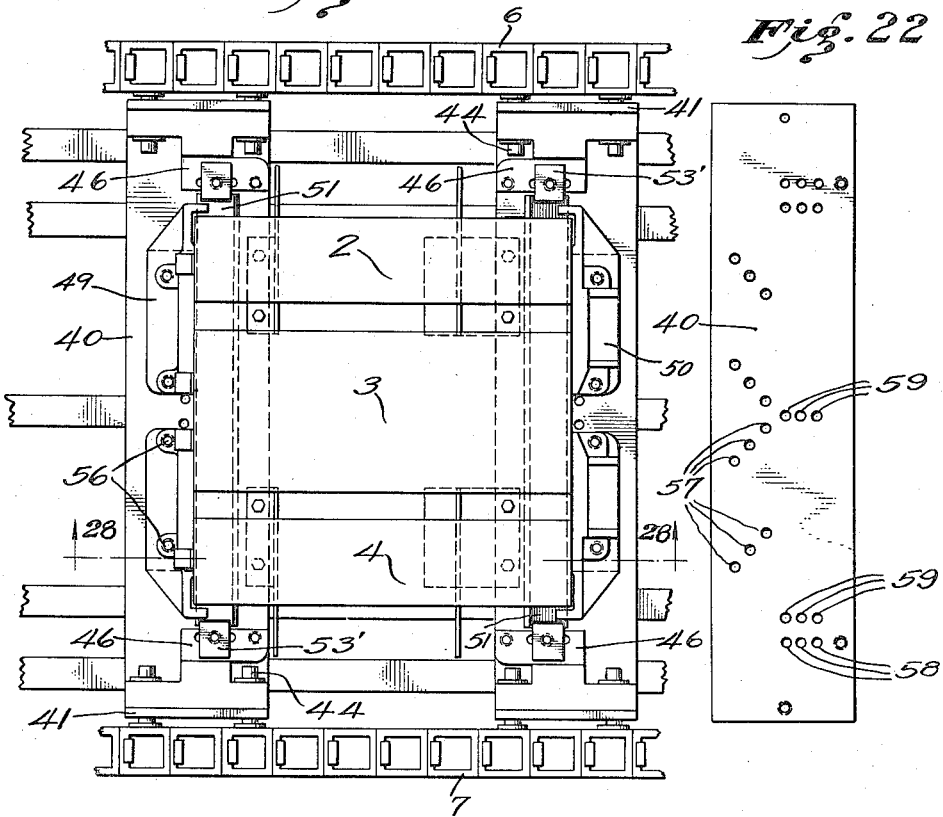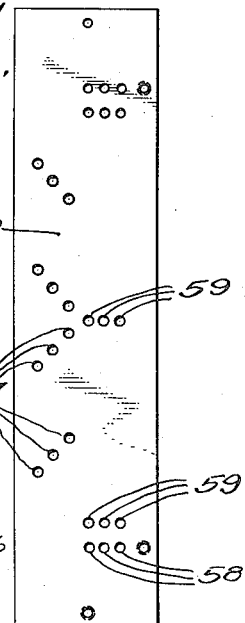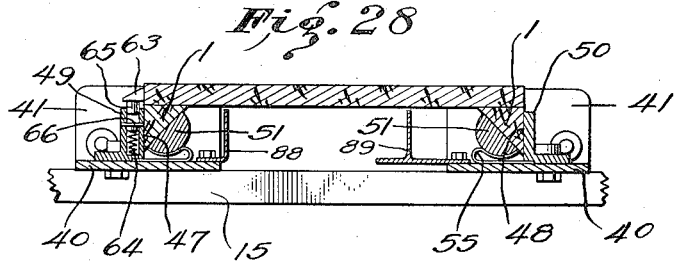

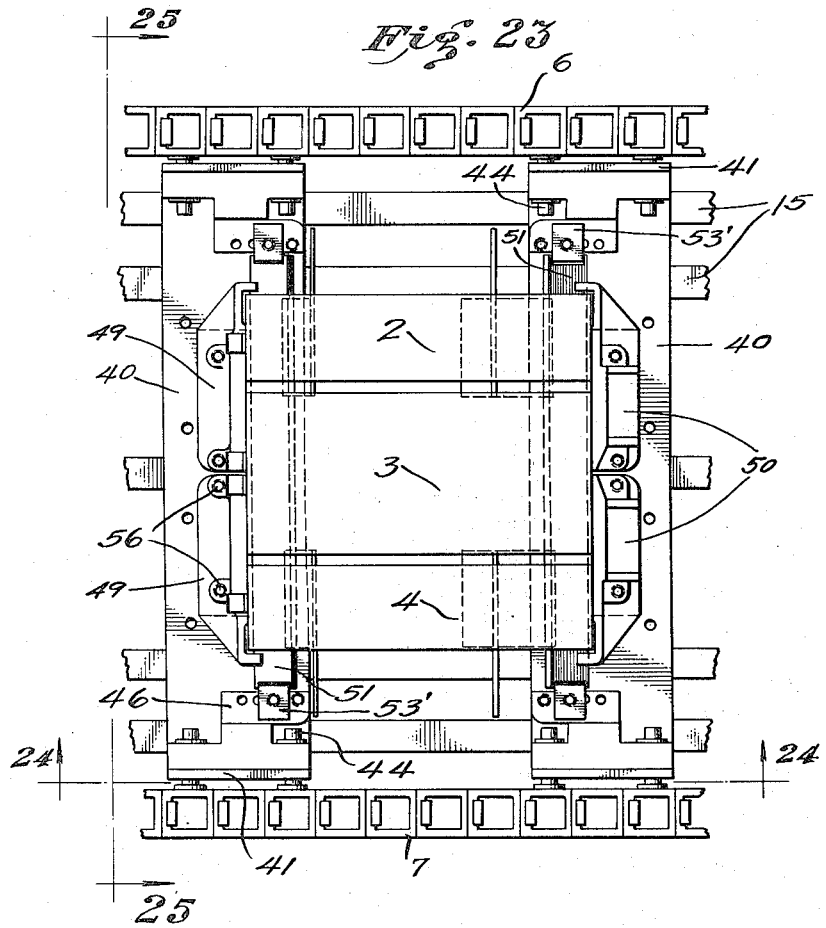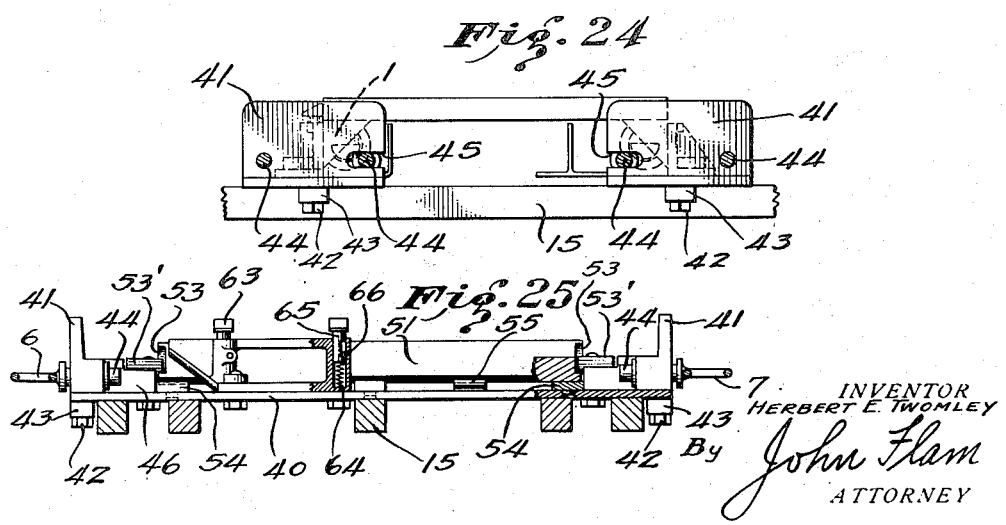

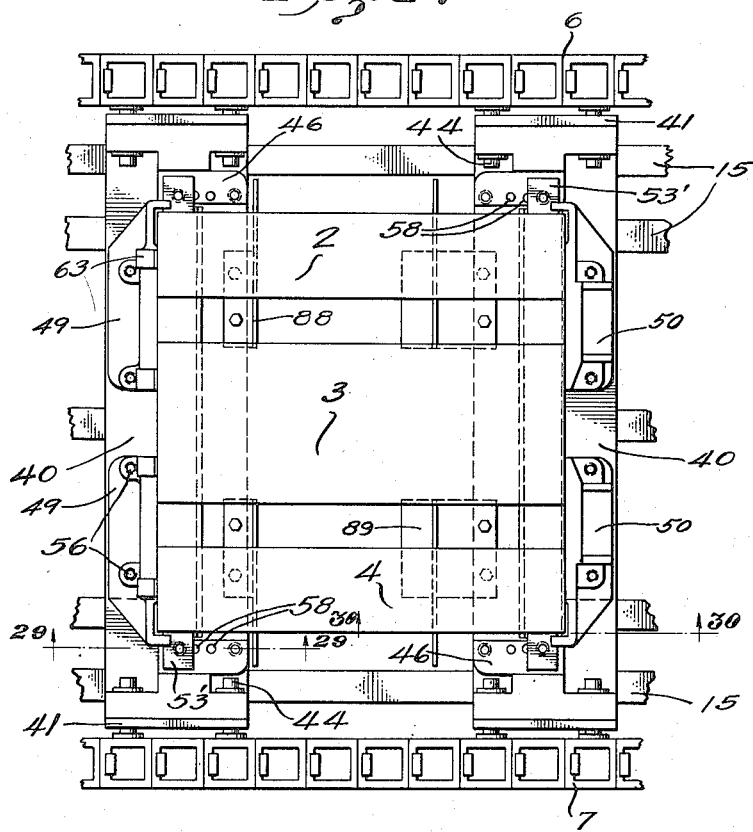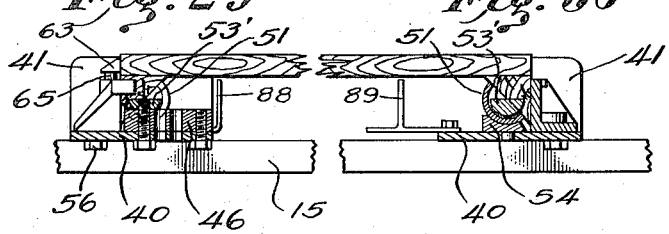

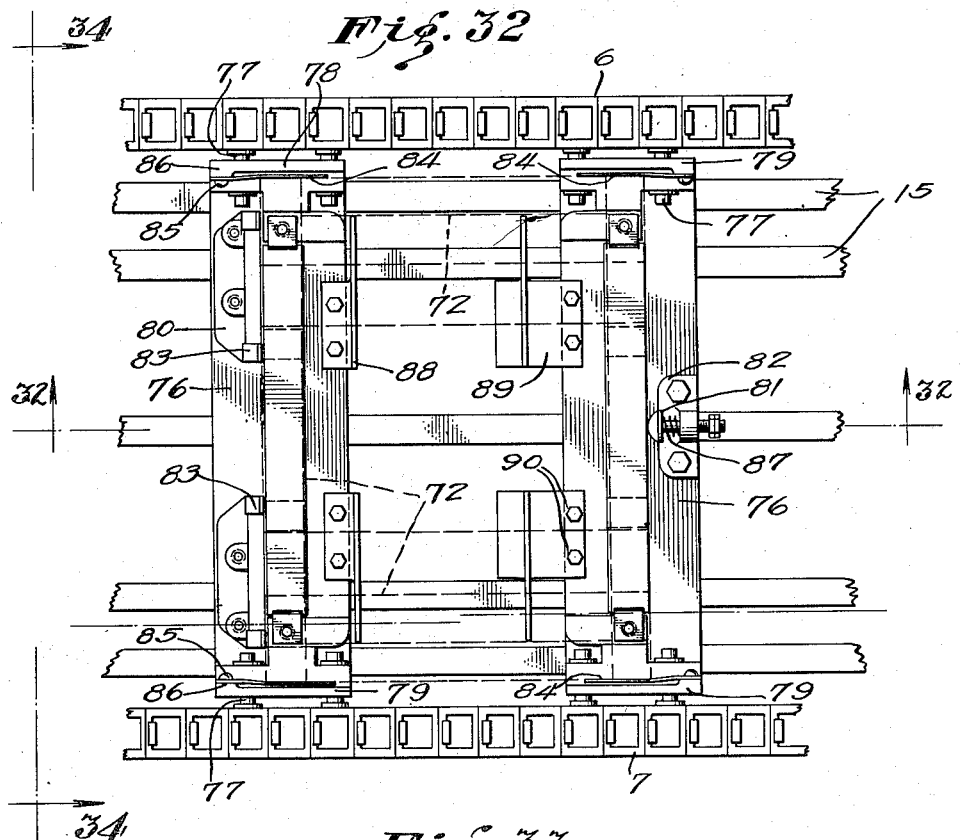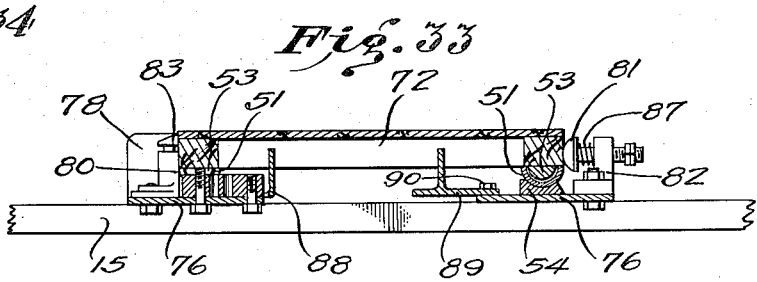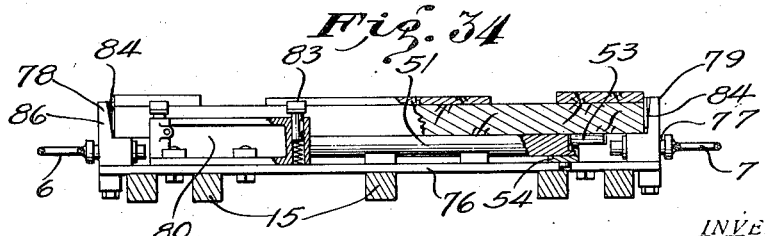

Patented Mar. 19, 1935

1,994,798

UNITED STATES PATENT OFFICE 1,994,798

MACHINE FOR MAKING VARIOUS SIZED CRATE HEADS

Herbert E. Twomley, Riverside, Calif., assignor to The Estate of George D. Parker, deceased, Donald Parker and Citizens National Trust and Savings Bank of Riverside, administrators Application August 15, 1931, Serial No. 557,346

26 Claims. (Cl. 1—8.1)

This invention relates to a nailing machine. More particularly, the invention relates to a machine having a conveyor which first moves the members to be nailed into proper operative position with respect to the nailing mechanism, and then moves the nailed product to a discharge hopper. It is apparent that the conveyor, to secure this result, should be operated intermittently so that the parts to be nailed are kept stationary during the nailing operation.

A mechanism operating in this general manner is illustrated in the patent to G. D. Parker, No. 1,594,553, issued Aug. 3, 1926, and entitled: Machine for making boxes of different sizes.

In providing such an intermittently driven mechanism, it is advantageous to move the conveyor as fast as possible so as to maintain a high output. Such fast movement is quickly stopped and started produces a heavy shock on the machine. It is one of the objects of my invention to provide a mechanical drive for the conveyor such that the acceleration and deceleration are gradual, eliminating excessive wear and shock.

In supplying crates for agricultural products, such as lettuce and cantaloupes, several definite sizes of crates must be provided. In the process of making the completed crates, one of the steps is the nailing of shooks on a frame to form the crate head. It is another object of my invention to provide a conveyor mechanism that can readily be adjusted to accommodate elements to make any one of a number of sizes of crate heads.

In the movement of the conveyor mechanism, the adjustable forms for the crate head frame and shooks to be nailed thereon, are arranged automatically to pick up the shooks as they pass hoppers holding the shooks. This can be accomplished by stacking the shooks one on top of another in the hoppers, and the forms move the lowermost shooks of the hoppers laterally out from under the stack. It is another object of my invention to provide a simple and effective hopper mechanism to accomplish this result, and especially that is so constructed and arranged that in the event of a jam in the forms, the hopper can yield to prevent any of the parts from breaking.

In the manufacture of crate heads for cantaloupes, the frame of the head is formed merely by a pair of triangular posts, which in the completed crate form the corner posts. These triangular posts vary considerably from the specified dimensions as they come from the mill. It is still another object of my invention so to make the forms that they automatically compensate for these variations, and adjust themselves readily to the posts.

I accomplish this result by providing a rest or support that is yieldable and that accommodates the diagonal face of the post even when the angle of the face or the width thereof varies slightly. Furthermore, these rests can be hardened to provide clinching anvils for the nails when they are driven through the posts.

It is still another object of my invention to make it possible to use these same anvils or rests to accommodate flat corner posts such as are used in lettuce crate heads.

It is still another object of my invention to provide a simple and effective stacking mechanism which automatically discharges and stacks the finished heads from the machine into a hopper where they can be removed and tied into symmetrical bundles.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Figure 1 is a partial side elevation of a machine embodying my invention, some of the parts being broken away, others in section, and still others in diagrammatic representation only, in order to clarify the structure;

Figs. 2 and 3 are views similar to Fig. 1, showing the rest of the machine;

Fig. 4 is a side elevation, similar to Fig. 1, but with other of the parts broken away, to illustrate the drive mechanism more clearly;

Fig. 5 is a part sectional and part plan view, taken along plane 5—5 of Fig. 6;

Fig. 6 is a front elevation, partly in section, of the machine;

Fig. 7 is a detail view, taken along plane 7—7 of Fig. 5;

Fig. 8 is a detail plan view, partly in section, showing the intermittent drive mechanism; the section being of the clutch and taken along plane 8—8 of Fig. 16;

Fig. 9 is a detail perspective view of a portion of the intermittent drive mechanism;

Figs. 10, 11, 12, 13, 14 and 15 are diagrams illustrating the successive positions of the intermittent drive mechanism;

Fig. 16 is a sectional view of the safety clutch, taken along plane 16—16 of Fig. 8; the clutch being in engaging position;

Fig. 17 is a view similar to Fig. 16, but showing the safety clutch disengaged;

Fig. 18 is a sectional plan view, taken along plane 18—18 of Figs. 1 and 2;

Fig. 19 is a perspective view of a cantaloupe crate head such as can be made by the aid of the invention;

Fig. 20 is an end view of the crate head;

Fig. 21 is a sectional detail through a corner post of the crate;

Fig. 22 is a plan view of a supporting plate showing the openings by the aid of which the frame elements can be supported;

Fig. 23 is a top plan view of a part of the conveyor, showing the forms adjusted for the smallest size crate head;

Fig. 24 is a view taken along plane 24—24 of Fig. 23;

Fig. 25 is a view taken along plane 25—25 of Fig. 23;

Figs. 26 and 27 are views similar to Fig. 23, but showing the forms adjusted to other sizes of crate heads;

Fig. 28 is a sectional view, taken along plane 28—28 of Fig. 26;

Figs. 29 and 30 are detail sections, taken respectively along planes 29—29, and 30—30 of Fig. 27;

Fig. 31 is a perspective view of a lettuce crate head made by the aid of my invention;

Fig. 32 is a plan view of a part of the conveyor showing the forms adjusted for a lettuce crate head;

Fig. 33 is a sectional view taken along plane 33—33 of Fig. 32; and

Fig. 34 is a side elevation, taken along plane 34—34 of Fig. 32.

I shall first describe the mechanism as adapted to nail crate heads together such as shown in Figs. 19, 20 and 21. These crate heads include a pair of triangular corner posts 1, to which are nailed the shooks 2, 3, 4. As shown most clearly in Fig. 21, the nails 5 for holding the shooks are clinched.

In making these crate heads, the corner posts 1 are placed in proper position on a moving conveyor, by the aid of forms, and the conveyor moves beneath three stacks of shooks, whereby the bottom shook of each stack is removed and automatically registered over the posts 1. The conveyor then moves the forms with the assembled shooks and corner posts to a position beneath a nailing mechanism, where the nailing is accomplished. Finally, the completed crate head, as shown in Fig. 19, is discharged into a hopper.

Of course, any form of conveyor belt can be used upon which the forms are accommodated. In the present instance, there is indicated a pair of spaced sprocket chains 6 and 7 (see particularly Figs. 2, 3, 5 and 6). These chains are looped over idlers 8 and 9 at the left hand end of the machine (Fig. 5) which are free to turn on a shaft 10. Shaft 10 is adjustable to slacken or tighten the chains, as by being mounted in adjustable bearing brackets 11 (Fig. 5) that are fastened to a supporting frame in a manner to be hereinafter described. As shown most clearly in this figure chains 6 and 7 are driven by sprockets 12, 13 adjacent the right hand end of the machine. These sprockets are fastened to a transverse shaft 14 that is driven in an intermittent manner through a mechanism detailed later on.

The main supporting frame for the conveyor chains 6 and 7 is formed by a series of longitudinal parallel rails 15. Serving as guards for the upper reaches, are a pair of longitudinal angle beams 16. Supported on the bottom of the rails 15 are the adjustable brackets 11. Rails 15 are supported in a manner hereinafter to be described. Lower frame angle members 17 are fastened to members 16 as by a series of struts 18. At the right hand end (Fig. 18) the rails 15 carry the bearing brackets 19 for drive shaft 14.

The arrangement is such that the level of the conveyor chain can be varied within limits. Thus the rails 15 are supported on the nailing table 20 that is vertically adjustable on the heavy side frames 21, 22. These frames in turn are supported on a base 23. For accomplishing the vertical adjustment of table 20, this table is provided with the side guides slidable on frames 21, 22, and gib plates 24 for defining guide grooves. These gib plates are slidable at all times on frames 21 and 22. A screw arrangement is provided for applying the vertical lifting or lowering force. For this purpose, a pair of vertical screw shafts 25 (Fig. 6) are rotatably mounted in table 20, and are provided with sprocket wheels 26. These wheels serve the dual function of supporting the table on their hubs during the adjusting operation, and also of accommodating the flexible chain or belt 27 whereby rotation of one shaft will cause equal rotation of the other shaft. These shafts engage in the stationary threaded members 27' fixed to frames 21, 22, whereby rotation of the shafts produces the desired vertical adjustment.

To keep the conveyor substantially level, adjustable standards 28 (Figs. 1, 2, 3, 5) are provided. In this instance, four such standards are shown, and they are in the form of screw shafts that engage sockets 29 formed in pairs on bases 30. These shafts are operated in pairs by sprocket wheels 31 fastened to the shafts and connected by chains 32. The top of the shafts are journalled in the conveyor frame structure.

The limited adjustment in height as thus provided is needed to position the elements in proper nailing position on table 20 to comply with the thickness of the wood pieces being nailed together. Such adjustable mechanisms are not necessarily limited to the particular form shown, as other equivalent and well-known forms can be used.

As shown most clearly in Fig. 5, drive shaft 14 can be further supported in bearings 33, supported in an adjustable manner with respect to frames 21, 22, as by the adjustable strut devices 34. On this figure, I also indicate a handwheel 35 for manual rotation of shaft 14, which may be desired during the process of setting up the machine. Another handwheel, not shown, may be provided at the other end of the shaft 14.

However, the power drive during operation of the machine is accomplished by the aid of a sprocket wheel 36 (Figs. 4, 5, 18) fastened to shaft 14 and driven by a sprocket chain 37. This sprocket chain is driven by a wheel 91, shown most clearly in Figs. 5 and 8. This wheel is adapted to be driven by a transverse shaft 38. This shaft 38 is supported in bearings provided in the side frame 22 and in an intermediate standard 39 (Figs. 5, 8 and 9). This shaft, as will be later described, operates intermittently to advance the conveyor by a definite amount and to position the wood elements of the crate head beneath the nail driving mechanism above nailing table 20.

Before detailing the intermittent drive mechanism, it is apt at this time to describe how the elements 1, 2, 3, 4 (Figs. 19, 20, 21) of the crate head are supported in forms on the conveyor. At definite equidistant intervals, the chains 6 and 7 pivotally carry a structure extending across the chains, and forming an adjustable support for the corner posts 1. The number of forms is of course dependent upon the overall length of the chains 6, 7, the present machine accommodating fifteen pairs of forms for accommodating corner posts for fifteen crate heads. As shown most clearly in Figs. 22 to 30, each form is supported on a plate 40 that is hingedly connected to the chains 6, 7, and that slide on stationary rails 15. This hinged connection is provided by securing, at each end of the plate, standards 41. These standards are secured to plate or base 40 as by bolts 42, which also serve to hold the gib strips 43 on the bottom side of the plates to serve as guards or guides against the outside rails 15. The standards 41 are furthermore extended upwardly to form a support for the lower reach of chains 6, 7, when the forms are in the inverted position, these projections contacting with the horizontal legs of the lower frame members 17. This is shown most clearly in Fig. 6.

Standards 41 are each provided with a pair of pin receiving apertures for accommodating pins 44, carried by the chains 6, 7 (Fig. 24). One of the pair of apertures can be slotted as indicated at 45, to permit the pins to come closer together as the chains 6, 7, pass around the sprockets at the ends of the conveyor. It is thus apparent that the spaced pins 44 serve to support the plates 40 and slide them over the rails 15.

In the form now being described, the corner posts 1 are placed by hand into the forms, in a position transverse to the conveyor. A pair of such posts are of course associated to produce the complete crate head. These triangular posts do not run true, the mill being allowed considerable tolerances, and the angle of the sloping face varies. The forms for accommodating these posts are therefore made sufficiently conformable to take care of this variance. As shown most clearly in Fig. 28, the post 1 has a straight side in contact with a stationary face 47, 48 provided by the forms 49, 50 fastened to the base plate 40. The slanting side of the post rests against an anvil 51 that is rotatable so that its contacting face is urged into parallelism as post 1 is inserted between face 47 or 48 and the anvil 51.

In the present instance, the anvil 51 is shown as half-round. The rotation of the anvil is permitted about the center of the flat face of the anvil. To support this anvil in a rotatable manner with respect to the other elements of the form, each anvil has a half-round hollow 53 (Figs. 25, 29, and 30) at each end, in which are engaged stationary half-round pivots 53'. These pivots are fastened to the horizontal extensions 46 of the standards 41, as shown most clearly in Fig. 29. To form a further support for the anvils, curved rests or half-bearings 54, dowelled into plate 40, are also provided adjacent each end of the anvil. Furthermore, there is a slight play permitted between the anvil 51 and the stationary parts 53' and 54. This permits further opportunity for the anvils to accommodate themselves to the slanting faces of the corner posts 1. Flat, reversely bent springs 55 urge these anvils resiliently toward the sloping faces, but give sufficiently as required by the particular post 1 that engages the anvil. These springs are supported on the plate 40. There is sufficient friction between the springs and the anvils to cause these anvils to retain their approximate correct angular positions, even after the nailed crate heads are removed, for the reception of a succeeding set of posts 1.

In order to make it possible to accommodate several different sizes of crate heads between the forms 49 and 50, these forms as well as anvils 51 are adjustably mounted on plates 40. To provide a complete crate head unit, four forms 49, 50 are needed, one at each of the four corners of the head, and each defining a corner. Each of these forms is adapted to be fastened by a pair of bolts 56, engaging any one of a series of apertures 57 (Fig. 22) in the supporting plate 40. Similarly, the extension 46 of each standard 41 is provided with a corresponding series of apertures 58 for the accommodation of the pivot 53' supported in any of the corresponding adjusted positions. Also, the half bearing 54 is arranged to have its dowel pin accommodated in any one of a series of apertures 59 in plate 40.

Figs. 23, 26, and 27 show the series of possible adjustments for different sized crate heads. The forms 49, 50 are progressively moved outwardly as the crate head size is increased.

After the corner posts 1 are inserted by hand into the forms, the arrangement is such that the movement of the conveyor toward the nailing mechanism causes the forms 49, 50 automatically to position shooks 2, 3, 4, (Figs. 23, 26, 27) across the posts 1, so as to prepare these parts 1, 2, 3, 4 for the nailing mechanism. The hopper structure for the shooks whereby this is accomplished is shown in Figs. 2 and 18. It includes a cross frame 60 forming a rear brace or support for the series of hopper sides 61 that are adjustably mounted on the cross frame. These hoppers accommodate the stacks of shooks 2, 3, 4 on bottom flanges 62 of the sides 61. The lowermost shooks are adapted to be slid out from under the stacks by the action of dogs 63 (Fig. 28) slidable in bosses provided in the forms 49. Each of these dogs is urged to an upper position by a spring 64. The shank 65 of the dog 63 is cut away to provide shoulders to cooperate with a stationary pin 66 (Fig. 25) extending through the boss in which the shank 65 is accommodated. In this way, the movement of dog 63 is limited.

Provisions are made whereby any jam in the forms will not cause any breaking of the hoppers 61. For this purpose, the hopper support 60 is yieldingly supported, so that if undue pressure is applied on the bottom thereof, it can rise to a limited extent. Thus the support 60 is provided with opposed feet 67 arranged to rest on top of the horizontal legs of frame members 16. Instead of being firmly fastened thereto, the fastening is provided by posts 68 passing through clearance apertures in the feet 67, and by compression springs 69 surrounding the posts and urging the feet downwardly with a force sufficient to maintain the hopper structure in operative position. Nevertheless, these springs can be compressed against the heads of posts 68 upon an undue force acting on the hoppers to relieve any jam that may occur, as by reason of a faulty shook.

As the shooks 2, 3, 4 are pushed out by dogs 63, they assume the correct position for nailing, as shown in the plan view, Fig. 18. These shooks are further maintained against displacement by the aid of a flag 70 made of canvas or rubber, or other soft yielding material. This flag is supported above the movement of the shooks and rests thereon after the shooks are extracted from the hopper mechanism. For this purpose, supporting brackets 71 are mounted on the rear of the hopper structures.

Before describing how the assembled shooks and corner posts are moved into position onto nailing table 20, to rest there during a nailing operation, it is desired to describe an alternative structure for the forms, adapting them to be used for making lettuce crate heads. This form is shown to best advantage in Figs. 32, 33, 34; and the complete lettuce crate head is shown in Fig. 31.

Lettuce crate heads usually include a rectangular frame 72 on which are nailed the shooks 73, 74, 75. The frame 72 is nailed together either previous to their being inserted into the forms shown in Figs. 32, 33, 34, or after the shooks are nailed on by the present machine. These heads also, are made in several sizes, and the form structure is such that it can be adjusted to suit any of a number of sizes. In this case, the plates 76 are arranged to slide over rails 15 and are supported on the chains 6 and 7 as by the aid of pins 77 and standards 78, 79. The frame 72 is inserted by hand into the forms, and in such position that one edge abuts the abutments 80 at one side of the forms, and the other edge is engaged by a spring pressed pin 81. This pin is free to slide in a standard 82 fixed to plate 76 near its center. A compression spring 87 surrounds the pin and resiliently urges it to engaging position.

Abutments 80 are in general constructed similarly to form elements 49 of the cantaloupe crate head forms. They are adjustably mounted on plate 76 and are each provided with the retractile dogs 83 for gripping the ends of the shooks 73, 74, 75, as the forms pass underneath the shook hopper structure 60—61. This structure of course is adjusted to provide alined hoppers for the three panel elements or shooks, as hereinbefore explained in connection with the cantaloupe crate heads.

The sides of the frame 72 are arranged to be engaged by yielding spring arms 84. Each standard 78, 79 supports one of these arms, as by the aid of screws 85, engaging extension 86 of the standard. These yielding arms thus compensate for variation in the width of the frame 72. Furthermore, four gauge members 88, 89 are fastened to plates 76, as by the bolts 90, for accurately positioning the side posts of frame 72. The top surfaces of these members also serve as ejectors of the nailed crate heads, by engaging and pushing against the lower surface of the panels as the forms follow the chains around sprocket wheels 12, 13. This action is shown clearly in Fig. 1.

In order to provide a flat rest for the bottom surface of the frames 72, the anvil members 51 are fastened to the standards 78, 79 in such manner as to present a flat surface upon which the frame 72 is disposed. The pivot supporting elements are arranged as before, and include the bearing block 54 and the half-round pin 53.

I shall now describe how the conveyor chains 6, 7 are intermittently actuated to move the forms successively onto table 20. One such form with the assembled shooks and corner posts for making a cantaloupe crate head is shown in proper position in Fig. 18. The arrangement is such that the sprocket wheel 91 (Fig. 8) is driven through exactly one revolution; then it stops for a nailing interval, and the cycle is then repeated. By proper choice of the number of sprocket teeth in wheel 91, it is apparent that the conveyor can be advanced at each period of activity by exactly the amount represented by the spacing of the forms.

Shaft 38, which drives the sprocket wheel 91, is arranged to be driven in this intermittent manner by a continuously rotated shaft 92 (Figs. 4, 5, 6, 8 to 15 inclusive). This shaft is driven by any appropriate source of power, as, for example, an electric motor 93. This motor is fastened on a base 94 (Figs. 1 and 4), that is supported on the main base 23 of the machine. As shown most clearly in Figs. 4 and 5, the motor 93 has a pinion 93' driving a link belt 95 that engages a large gear wheel 96. This wheel in turn can be clutched to an intermediate shaft 97 that carries a pinion 98 that meshes with a large gear 99 fastened to the drive shaft 92.

Shaft 92 is journalled in bearings 100, 101 in frames 21, 22. Shaft 97 is similarly journalled in bearings 102, 103 also formed in the frames. To facilitate setting up, hand wheels 104 can be provided at the ends of the shaft 97. The wheel 96 can be clutched in and out with respect to shaft 97 to rotate this shaft. This clutching is accomplished by the aid of the mechanism now to be described, in connection with Figs. 1, 5, and 7.

Wheel 96 of course is continuously rotated by motor 93. It carries an integral friction clutch drum 105. Splined to shaft 97 is a clutch collar 106 which can be moved to cause engagement between a friction element carried thereby and the corresponding friction element in drum 105. The axial movement of collar 106 is provided by a fork 107, which is fastened to a manually controlled longitudinal shaft 108. This shaft is journalled in bearings 109 and 110. Bearing 109 is supported on main base 23, and bearing 110 is supported on the connecting web 30 of threaded standards 29 (Figs. 2 and 3). A hand lever 111 is fastened to the shaft 108 within reach of an operator who may stand near the machine, for operating fork 107 and thereby controlling the rotation of the main power shaft 97.

The operation of fork 107 is independently effected also by a foot pedal 112. This pedal is fixed to another longitudinal shaft 113 journalled in appropriate bearings in the webs 30 of the screw threaded standards 29. Depression of pedal 112 causes rotation of the fork shaft 108, as by the aid of the interlocking levers 114, 115 (Fig. 7) fastened respectively to shafts 113 and 108.

There is provided a brake arrangement which quickly stops the rotation of the power shaft 97 when the friction clutch 105 is disengaged. Thus shaft 97 carries a brake drum 116 adapted to be engaged by a friction band 117 urged to contacting position when the clutch is released. However, a wedge 118, fastened to the fork 107, moves between a pair of rollers 119 when the clutch is in engagement to expand the band 117. These rollers are supported on the lower side of the band 117.

As heretofore stated, the transverse shaft 92 is operated from shaft 97 as by pinion 98 and gear 99. This shaft 92 in turn operates the shaft 38 and actuates the conveyor mechanism in an intermittent manner. This intermittent drive is best illustrated in Figs. 8 to 15 inclusive. This drive is such that the shaft 38 is not started or stopped suddenly, but is gradually accelerated and decelerated so that it makes one revolution during a fraction of a revolution of the shaft 92. For this purpose, the shaft 92 carries a pair of toothed elements 120, 121, each forming virtually a mutilated gear and cam. Coacting with the element 120 are a pair of rollers or cam followers 122, 123. These rollers are arranged to follow a planetary motion around shaft 38, as by being journalled on pins 124 fastened on opposite ends of a pin crank 125 fastened to shaft 38. The pins 124 are located in this instance on opposite sides of a radial line passing through the axis of shaft 38.

The element 121 cooperates with similar rollers or cam followers 126, 127 pivotally supported on pin crank 128, which is also fastened to shaft 38. The radial line 128' joining the axes of rollers 126, 127 is at an angle to the radial line 125' joining the axes of rollers 122, 123, as clearly shown in the diagrams, Figs. 10 to 15 inclusive. In the present instance, this angle is shown as 90 degrees.

Reference can now be had particularly to the diagrams, Figs. 10 to 15 inclusive, to understand how these rollers 122, 123, 126, 127 are given a planetary motion of a complete revolution, by the cams 120, 121, thereby imparting one revolution to shaft 38. In these diagrams, shaft 92 is intended to be rotated in a clockwise direction, and the corresponding rotation of shaft 38 is counterclockwise.

In the position of Fig. 10, roller 122 coacts with the circular portion of cam 120; and roller 127 coacts with a corresponding circular portion of cam 121. These two rollers are in contact with the cam surfaces, so that there is no freedom of motion possible in either direction of the shaft 38, because the cam surfaces hold the rollers against such motion. This condition continues so long as the rollers 122, 127 remain on the circular portions, which correspond in extent to the period of rest between rotations of shaft 38.

In the position of Fig. 11, rollers 122 and 127 have just moved off the circular portions. Roller 122 is just entering pocket 130 of cam 120, and roller 127 is just rising on the raised portion of cam 121. The rise of cam 121 is just sufficient to keep both rollers in contact with the cam surfaces, the drive being thus positive. This is accomplished by the positive raising of roller 127, and the consequent rotation of shaft 38, bringing roller 122 down into the pocket 130. The rise is as gradual as desired at this stage, to start the motion of shaft 38 as smoothly and slowly as necessary.

In the position of Fig. 12, roller 127 has been raised still further, and roller 122 is substantially at the bottom of pocket 130. The succeeding period of motion now causes further raising of roller 127 up to the highest point of cam 121; pocket 131 of this cam comes into action for the reception of roller 126, paired with roller 127. At the same time, roller 122 rises out of pocket 130 and is urged upwardly by the high part 132 of cam 120. The roller 123, paired with roller 122 then comes into contact with the wall 133 of cam 120. This position of the operation is shown in Fig. 13.

At this stage, the rotation of shaft 38 is fastest. The roller 126 continues to be raised by the tooth 134 of cam 121, and roller 123 is correspondingly depressed into pocket 135 of cam 120. Further rotation of the cams 120, 121 causes roller 126 to be raised to the highest point of tooth 134, and roller 123 to be depressed to the lowest point of pocket 135. From then on, (Fig. 14), the roller 127 is engaged by the advancing wall of pocket 136 of cam 121; and roller 123 leaves the highest point of tooth 136'. Correspondingly, roller 122 is brought into engagement with the downward sloping wall 137 of cam 120.

At this stage, the rotation of shaft 38 is decelerated, roller 127 being gradually raised back to the circular portion of cam 121, and roller 122 being depressed correspondingly to the corresponding circular portion of cam 120. This condition is shown in Fig. 15. The shaft 38 is now stationary, and continues so until the gradually rising portion of cam 121 again raises roller 127, shown in Fig. 11. The cycle is then repeated.

From the foregoing, it is apparent that one of each pair of rollers 122, 123, and 126, 127 are respectively gradually lowered and raised to accelerate the rotation of shaft 38 gradually (Figs. 11 and 12); then the rollers are given a rapid motion by tooth 132 and depression 136 in a counterclockwise direction, in the nature of a gear action (Figs. 12, 13, 14); and finally the motion is slowed down to standstill (Fig. 15), the rollers reaching the circular part of the cams 120, 121.

An arrangement is provided for protecting the drive mechanism to the conveyor from being overloaded in case a jam occurs anywhere in the stages of operation. This arrangement includes a safety clutch (Figs. 8, 16, and 17) interposed between the shaft 38 and the conveyor drive sprocket 91. Thus this sprocket wheel is rigidly fastened to one element 138 of the clutch, as by screws 139 screwing into the face of the hub of element 138. The other element 140 is rigidly fastened to shaft 38, as by key 141. The element 140 telescopes into drum element 138 and drives this drive through a separable connection that automatically disengages when the driving torque required exceeds a maximum value.

For example, the member 140 carries a pawl member 142, which is pivoted on an axis 143 in an integrally formed arm 144 of driving member 140. This pawl has a clevis at its free end in which is journalled a roller 145 adapted to engage in a pocket or depression 146 on the inner periphery of drum 138. The shape of this pocket is one factor determining the amount of torque that can be transmitted; another factor is the force (provided as hereinafter described) which opposes the motion of roller 145 out of this pocket. This pocket is so formed that the forward edge 147 thereof, when the parts in the driving position of Fig. 16, is just a little to the right of the line joining the axis 143 of the pawl 142 and the axis of roller 145. The driving member 140 is driven by shaft 38 in a counterclockwise direction; and the driving torque is produced by a force acting in the line joining axis 143 and the axis of roller 145. Since this is exerted in a direction slightly to the left of pocket 146, the tendency is to move the roller 145 out of the pocket without imparting rotation to the drum 138.

However, there is provided an opposing force to this motion of the roller out of the pocket, that can be adjusted to determine the maximum torque capable of being transmitted. Thus a compression spring 148 that acts against the free end of pawl 142, and in a direction urging the roller 145 into the recess 146. The spring 148 is guided at one end on boss 149 on pawl 142; and at the other end on an abutment 150 which is adjustable, as by being fastened to a threaded set screw 151 that is accessible outside of the member 140.

In case the conveyor mechanism driven by wheel 91 is jammed, preventing rotation of drum 138, the pressure of spring 148 is overcome, roller 145 is forced out of pocket 146, and rolls, as indicated in Fig. 14, on the inner periphery of drum 138. This rolling continues until the jam is relieved. When this occurs, the roller 145 then can drive the drum 138 after it has again reached depression 146. The timed relation of the conveyor mechanism to the rest of the mechanism stays undisturbed, since the angular relation between the driving and driven elements is definitely fixed during driving operation.

The nailing operation can be performed by any desired type of mechanism. This operation is so timed by appropriate mechanisms driven from shafts 92 and 97 that it occurs during the period of dwell of the conveyor mechanism, and when a set of forms for the crate heads is centered on nailing table 20. This position is shown in Fig. 18. A set of shooks 2, 3, 4, in the forms 49, 50 is disposed directly over the nailing table and between guides 150'. These guides (Fig. 18) prevent these shooks from being laterally displaced, and are supported on a stationary frame above the angle beams 16 (Figs. 1 and 2).

The nailing operation can be performed by any desired type of apparatus. However, I shall describe a form which is now commonly used, in which nails are delivered to chucks that are lowered to the work; and then punches, sliding in the chucks, urge the nails in place. This mechanism is most clearly shown in Figs. 1, 4, 5, and 6. The nail chucks 151 are shown as of various kinds, to suit the different character and spacing of the nails. For example, to the left of the center line of Fig. 6, chucks are shown spaced for nailing lettuce crate heads; and to the right of the center line, chucks are shown spaced for nailing cantaloupe crate heads. These chucks can all be adjusted in position so as to place the nails where desired, and are supported on a plate 152 which is carried by a vertically movable frame 153.

The movement of frame 153 is for the purpose of lowering the chucks 151 close to the work, after which the frame 154, carrying the nail punches 155, is lowered to drive the nails into the crate head. When the machine is operated on cantaloupe crate heads, the nails are driven completely through the corner posts 1, as indicated in Fig. 21. The anvils 51 are purposely hardened to produce a clinching of these nails.

The movement of the chuck frame 153 is so timed as to make the chucks reach the crate head parts as late as possible after these parts are positioned on table 20; and to lift them off as soon after the punches 155 accomplish their driving function. In this way, a maximum amount of time is permitted for the movement of the forms. Both frames 153 and 154 are guided for vertical movement in the ways 154' (Fig. 1) formed in the frames 21, 22.

I shall now describe how vertical motion is imparted to frame 153. On the bottom of each side of frame 153 is a clevis 157, in which is pivoted a link 159. At its lower end, each of these links is pivoted in a clevis of an arm 160. As shown most clearly in Figs. 1 and 5, both of these arms are fastened to a transverse shaft 161, journalled in the side frames 21, 22. The arm 160 also carries a cam following roller 163. Each of these rollers contacts with a cam 164, the weight of the frame 153 acting to keep the follower always in contact with the cam surface. Both cams 164 are fastened to shaft 92, which is driven, as heretofore explained, through gears 98, 99, from the main power shaft 97.

As shown most clearly in Fig. 1, cams 164 are so formed that they permit the chuck frame 153 to drop during only a relatively small portion of a complete revolution of shaft 92.

The movement of the punch frame 154 is so synchronized that the punches 155 are forcibly driven through the chucks 151 during the time when chuck frame 153 is lowered. In the position shown in Fig. 1, the punch frame 154 is in its uppermost position. It is moved downwardly by a pair of pull rods 165 (Fig. 6) that are however resiliently connected to the frame 154 to compensate for any accidental variation in the thickness of the shook materials. The resilient force is stiff enough nevertheless to drive the nails completely into the shooks.

Thus trunnions 166 (Figs. 1, 4, 5) extend from the sides of the frame 154, upon each of which is pivoted clevis 167. Through a bearing in the bottom of the clevis extends the pull rod 165, the top end of which extends between the legs of the clevis. Surrounding this top end is the heavy compression spring 168, exerting an expansive force between the bottom of clevis 167 and a nut 169 threaded on rod 165. It is thus apparent that when rods 165 are pulled downwardly, the springs 168 transmit this downward pull to the frame 154.

For pulling these rods down to urge the punches 155 downwardly into chucks 151, in proper timed relation, the shaft 92 is utilized. At one end of this shaft, a crank 170 is fastened. Its free end is pivoted to an eye member 171 fastened to the lower end of pull rod 165. At the other end of shaft 92, an eccentric pin 172 fastened into the side of drive gear 99 is utilized for the same purpose. An inspection of Fig. 1 shows that frame 154 will reach its lowermost position when shaft 92 will have rotated through 180 degrees from the position shown, and this corresponds also to the lowermost position of chuck frame 153. By comparing the relation of cam 164 and crank 170, it is also seen that the punch frame 154 starts to move down before the chuck frame 153; but they reach their lowest position about simultaneously.

The chucks 151 can be supplied with nails prior to the driving operation, as by the aid of flexible delivery tubes 173 (Fig. 6). These tubes move with the chuck frame 153, as they are supported at their upper ends in a frame 174 supported on the top of rods 156. These rods pass through frame 154 and are screwed into frame 153 and held in clamped position by nuts 158. As the frame 153 descends, these tubes also descend. Each tube 173 carries an upper rigid tube 175 which telescopes over a stationary tube 176 carried by the nail delivery funnels 177. These funnels are supported in any appropriate manner on the main framework. Nails can be selectively dropped into these funnels in any well-understood manner.

Thus in Fig. 1 there is shown in diagrammatic form, a ratchet 178 actuated for each actuation of driving frame 154, as by the link 179. This link is engaged in an eye 180 in frame 154 and is accordingly pulled down by the downward movement of the frame. The ratchet 178 actuates nail picks (not shown) above funnels 177, which picks are supported by a bar 181. The nails 182 are fed by gravity to the bar on inclined guides 183 leading from a nail pan 184.

To keep the nails in pan 184 in free flowing condition, the pan can be slowly oscillated about pivots in brackets 185. This oscillation is accomplished by the aid of a link 186. This link is pivoted to an intermediate point on a lever arm 187. This arm is pivoted at one end in a bracket 188, and its free end is connected to a link 189 pivotally connected to pan 184. Reciprocation of link 186 to produce oscillation of lever 187 and consequently oscillation of pan 184, is accomplished by a crank 190 fastened to a shaft 191 (Fig. 4). Shaft 191 is slowly rotated through reduction gearing interposed between shaft 191 and main drive shaft 97. Thus fastened to drive shaft 97 there is a pinion 192 meshing with a gear 193. This gear is fastened to a shaft 194 carrying a gear 195. This gear in turn meshes with a gear 196 on a shaft 197. This shaft carries a pinion 198, meshing with the gear 199 fastened to the crank shaft 191. Thus pan 184 is oscillated whenever motor 93 is energized.

After the crate head is nailed in the manner now described, the conveyor mechanism moves it toward the right, as viewed in Figs. 1, 2 and 3, and is unloaded and stacked by a mechanism now to be set forth.

Adjacent the discharging end of the conveyor, there is a pair of overhanging brackets 200 (Figs. 1 and 4). These brackets support a transverse shaft 201 on which a roller 202 is mounted. The axis of this roller is somewhat below the upper reach of conveyor chains 6 and 7 and to the right thereof, as shown most clearly in Fig. 1. As the chains 6 and 7 carry the crate head form over the sprocket wheels 12 and 13, members 89 tilt up and urge the completed crate head upwardly so that it is freed from the forms and drops over the roller 202. A crate head 203 in Fig. 1 is shown in the act of falling over this roller.

The crate heads fall onto upwardly inclined skids 206 in the form of parallel angle irons sloping upwardly. These skids are supported on a standard as well as on links 208, connected to the conveyor frame structure.

A hopper 204 has side plates 205 (Fig. 5) fastened to skids 206, and ensures that the crate heads will be deposited adjacent the lower end of the skids, in the position indicated at 207 (Fig. 1). This hopper has an open mouth into which the crate head enters. The forward edge of the head as it is moved by the conveyor strikes a plate 208' (Fig. 1) extending across the top of the hopper, and causes the completed head to turn downwardly over roller 202.

The completed crate head, after being so discharged, rests at its bottom edge on skids 206; and its side rests against a pusher plate 209. This plate extends slightly below and between the skids 206; and extends upwardly between the side plates 205 of the hopper. It is arranged, however, to be moved toward the right to the position shown at 210 (Fig. 1) and pulled back again, for each operation of the nailing machine. To guide this motion, pusher plate 209 is provided with a pair of rollers 211 that run on the horizontal flanges or skids 206, using these skids as rails.

This pushing action, as explained hereinafter, is properly timed to act upon the deposited crate head 207, and to urge it past the spring retainers or dogs 212 fastened to the hopper sides 205. As the crate head is pushed by plate 209 past these dogs, they are resiliently urged apart to permit the passage of the crate head. Now as plate 209 is pulled back to the left, the head slides back on skids 206 until it contacts with these dogs, as shown in Fig. 1. Successive crate heads can be passed between dogs 212; these successive heads of course contact with the preceding head as it is pushed by plate 209; and this plate then urges all of the accumulated crate heads up on the inclined skids 206. As the plate 209 is pulled back to the left, beyond spring dogs 212, this accumulated stack moves by gravity up against the dogs. An attendant, after a sufficient number has thus been accumulated, removes them and can bind them together into a convenient bundle.

The timed reciprocations of plate 209 are caused by the aid of a bar 213 (Figs. 1, 4, 5, 6) fastened to the back of plate 209. This bar is resiliently urged toward the left as by a long coiled tension spring 214. This spring is anchored at one end in a hook 215 supported on the conveyor framework. Its other end is fastened into an aperture in the end of bar 213. Also pivotally joined to this end of bar 213 is a lever 215'. This lever is pivoted in a standard 216 mounted on base 23. At an intermediate point, this lever carries a cam follower roller 217, urged into contact with cam 218 by the action of spring 214. This cam is fixed to shaft 92, and is so formed that it urges roller 217 to the right once each revolution, thereby stretching spring 214 and urging bar 213 and pusher 209 also to the right. The period of action is set to agree with the discharge of the crate head into hopper 204.

A brief summary of the operation of the machine can now be set forth. One or more operators stand by the machine and insert by hand, the corner posts 1 of the cantaloupe crate heads, or the four posts making up the lettuce crate heads, into the forms 49, 50, (Figs. 18, 23) or 80, 81, (Figs. 32, 33). The machine can be started or stopped by the aid of the pedal 112 or hand lever 111. The hoppers 61 are kept full of panels or shooks, so that the dogs 63 or 83 of the forms remove the bottom panels and carry them to the nailing table 20. This movement to the table is accomplished by the intermittent conveyor drive mechanism shown in Figs. 8 and 9.

As soon as the forms reach the table 20, the chuck frame 153 descends by gravity to contact the chucks 151 with the tops of the panels. Then the driving frame 154 is pulled down by cranks 170, the nails having been previously passed to the chucks by the nail selector mechanism. Upon upward movement of the frames 153, 154, the crate head is moved into discharge hopper 204, falls by gravity against the pusher plate 209. This plate then urges the complete head up on the inclined skids 206, where they are stacked for removal. Due to the inclination of the skids, this stack slides by gravity against dogs 212, where they remain until removed. The skids are supported at one end as by brackets or supports 207'.

I claim:

1. In a nailing machine, a conveyor mechanism, a series of forms for the material to be nailed, said forms being supported by the conveyor, a nailing mechanism to which the forms are moved, and non-reciprocating means for intermittently driving said conveyor, comprising a driving shaft, a driven shaft, and a plurality of cam and follower connections between the shafts.

2. In a nailing machine, a conveyor mechanism, a series of forms for the material to be nailed, said forms being supported by the conveyor, a nailing mechanism to which the forms are moved, and means for intermittently driving said conveyor, comprising a driving shaft, a driven shaft, and a pair of cam and follower connections between the shafts, the driving action of the connections overlapping.

3. In a nailing machine, a conveyor mechanism, a series of forms for the material to be nailed, said forms being supported by the conveyor, a nailing mechanism to which the forms are moved, and means for intermittently driving said conveyor, comprising a driving shaft, a pair of cams on said shaft, a driven shaft, a pair of diametrically opposite cam followers carried at a radial distance from the axis of the driven shaft and coacting with one cam, and another pair of diametrically opposite cam followers, angularly displaced from the first mentioned pair of cam followers, and coacting with the other cam.

4. In a form for use in nailing machines, a supporting base, a series of form elements adjustably supported on the base, said elements being arranged to contact with the edge of the part to be nailed, and an angularly floating support for contacting with the bottom surface of the part to be nailed.

5. In a form for use in nailing machines, a supporting base, an anvil member providing a rest for the lower surface of a part to be nailed, means providing a support on the base for the member to permit said member to aline itself with said part, and means for resiliently urging the member toward the part to be nailed.

6. In a form for use in nailing machines, a supporting base, an anvil member providing a rest for the lower surface of a part to be nailed, means providing a loose bearing for the member, along a longitudinal axis of the member, and means for resiliently urging said member toward the part to be nailed, to take up the play in the bearing.

7. In a form for use in a nailing machine, a supporting base, an anvil member providing a rest for the lower surface of a part to be nailed, means forming a stationary guide for another surface of the part, and means supported on the base, whereby the rest can accommodate itself to the angle of inclination of the said lower surface.

8. In a form for use in a nailing machine, a supporting base, an anvil member providing a rest for the lower surface of a part to be nailed, means forming a stationary guide for another surface of the part, and means supported on the base whereby the rest can accommodate itself to the angle of inclination of the said lower surface, comprising a floating bearing support for the anvil member.

9. In a form for use in a nailing machine, a supporting base, an anvil member providing a rest for the lower surface of a part to be nailed, means forming a stationary guide for another surface of the part, and means supported on the base, whereby the rest can accommodate itself to the angle of inclination of the said lower surface, as well as to the thickness of the said part.

10. In a form for use in a nailing machine, a supporting base, an anvil member providing a rest for the lower surface of a part to be nailed, and means supported on the base, whereby the rest can accommodate itself to the angle of inclination of the said lower surface, as well as to the thickness of the said part, comprising a loose bearing for the anvil for permitting movement about an axis longitudinal of the anvil, and a spring member engaging the lower end of the anvil.

11. In a form for use in nailing machines, a supporting base, and a series of form elements supported on the base, said elements being arranged to contact with the edge of the part to be nailed, said base having a series of apertures by the aid of which the elements can be adjustably supported to suit different sizes of the parts to be nailed.

12. In a form for use in nailing machines, a supporting base, a series of form elements supported on the base, said elements being arranged to contact with the edge of the part to be nailed, retractile dogs carried by the forms and projecting above the level of the forms, and means for resiliently mounting said dogs on the forms.

13. In a form for use in nailing machines, a supporting base, an anvil member providing a rest for the lower surface of a part to be nailed, means forming a stationary guide for another surface of the part, means providing a loose bearing for the member along a longitudinal axis of the contacting surface of the member, and means for adjustably supporting said loose bearing on the base.

14. In a form for use in nailing machines, a supporting base, an anvil member providing a rest for the lower surface of a part to be nailed, means providing a loose bearing for the member along a longitudinal axis of the contacting surface of the member, means for adjustably supporting said loose bearing on the base, and a spring contacting with the lower surface of the anvil to urge it upwardly.

15. In a nailing machine, a conveyor structure, a hopper in which elements to be nailed are supported above the conveyor structure, and means yieldingly supporting said hopper over the conveyor.

16. In a nailing machine, a hopper having an opening in the bottom to permit a stack of panels in the hopper to be removed one by one from the bottom of the stack by the movement in a transverse direction, and means for supporting the hopper, comprising one or more feet, and a compression spring yieldingly urging the foot toward its support.

17. In a device for discharging material from a nailing machine, a pair of upwardly inclined angle irons, one of the flanges of each iron cooperating with the other to define a skid, into the lower end of which the material is deposited on its edge, a plate against which the material rests near the lower end of the skid, rolls at each side of the plate and resting on the flanges, and means for moving said plate upon the skid in the timed relation to the nailing operation.

18. In a device for discharging material from a nailing machine, a pair of upwardly inclined angle irons, one of the flanges of each iron cooperating with the other to define a skid, into the lower end of which the material is deposited on its edge, a plate against which the material rests near the lower end of the skid, rolls at each side of the plate and resting on the flanges, means for moving said plate upon the skid in timed relation to the nailing operation, and means for preventing the material so moved up on the skid from returning to the plate.

19. In a nailing machine, a conveyor, a pair of supporting elements arranged transversely of the conveyor, means adjustably supported on said elements and defining an adjustable form for coacting with the edges of a box element, and means defining an adjustable rest for the bottom surface of the box element.

20. In a nailing machine for making a box element that includes posts upon which shooks are to be nailed, a movable support, a form for accommodating the posts, supported on the support, said form comprising a member forming a vertical surface to contact with one side of a post, and an anvil adjacent said surface, said anvil having a plane surface, and means whereby the angular relation of the two surfaces can be varied to accommodate triangular posts by resting the sloping face of the post on the anvil.

21. In a nailing machine for making a box element that includes posts upon which shooks are to be nailed, a movable support, a form for accommodating the posts, supported on the support, said form comprising a member forming a vertical surface to contact with one side of a post, an anvil adjacent said surface, said anvil having a plane surface, a loose bearing for the anvil to permit it to accommodate itself to various angular relationship with the vertical surface, and a spring engaging the lower side of the anvil.

22. In a nailing machine for making a box element that includes posts upon which shooks are to be nailed, a movable support, a form for accommodating the posts, supported on the support, said form comprising a member forming a vertical surface to contact with one side of a post, and an anvil adjacent said surface, and said form and anvil being adjustably mounted on the support to accommodate any one of a number of sizes of box elements.

23. In a form for use in a nailing machine, a supporting base, a stationary guide having a surface to contact with a part to be nailed, said surface being at an angle to the horizontal, another guide adjacent said stationary guide, for contacting with another surface of the part to be nailed, and angularly floating means for supporting said other guide on the base.

24. In a form for use in a nailing machine, a supporting base, a stationary guide having a surface to contact with a part to be nailed, said surface being at an angle to the horizontal, another guide adjacent said stationary guide, for contacting with another surface of the part to be nailed, means for rotatably supporting said other guide on the base, and friction means for holding said other guide in any angular position.

25. In a form for use in nailing machines, a conveyor having a lower and an upper reach, a supporting base carried by the conveyor, a form on the base, and an upright member rigidly supported on the base and extending up toward the part carried by the forms, and arranged to contact with the part as the base passes from the upper to the lower reach to eject the part from the form.

26. In a form for use in nailing machines, a conveyor having a lower and an upper reach, a wheel for guiding the conveyor from the upper to the lower reach, a two-part supporting base carried by the conveyor, a form on the base, and an upright member rigidly supported on the forward part of the base and serving to eject the nailed material in the form as said part of the base passes over the wheel.

HERBERT E. TWOMLEY.